United States Patent
Hamaguchi et al.

(10) Patent No.: US 10,392,777 B2
(45) Date of Patent: Aug. 27, 2019

(54) WORK VEHICLE

(71) Applicant: KOMATSU LTD., Tokyo (JP)

(72) Inventors: Masahiko Hamaguchi, Komatsu (JP);
Kenichi Muramoto, Komatsu (JP);
Yuuki Shimasaki, Komatsu (JP);
Masataka Setoguchi, Komatsu (JP);
Jun Ito, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/564,908

(22) PCT Filed: Jul. 22, 2016

(86) PCT No.: PCT/JP2016/071598
§ 371 (c)(1),
(2) Date: Oct. 6, 2017

(87) PCT Pub. No.: WO2017/033640
PCT Pub. Date: Mar. 2, 2017

(65) Prior Publication Data
US 2018/0100289 A1 Apr. 12, 2018

(30) Foreign Application Priority Data
Aug. 24, 2015 (JP) ................. 2015-164484

(51) Int. Cl.
| B60R 25/10 | (2013.01) |
| E02F 9/08 | (2006.01) |
| B60R 3/02 | (2006.01) |
| B60R 25/01 | (2013.01) |
| B60R 16/037 | (2006.01) |
| B60L 8/00 | (2006.01) |
| E02F 9/16 | (2006.01) |
| E02F 9/26 | (2006.01) |
| B60L 53/51 | (2019.01) |

(52) U.S. Cl.
CPC ............ *E02F 9/0833* (2013.01); *B60L 8/003* (2013.01); *B60L 53/51* (2019.02); *B60R 3/02* (2013.01); *B60R 16/037* (2013.01); *B60R 25/01* (2013.01); *E02F 9/0891* (2013.01); *E02F 9/163* (2013.01); *E02F 9/26* (2013.01)

(58) Field of Classification Search
CPC ........... E02F 9/0833; B60R 25/01; B60R 3/02
USPC .................................... 340/426.28
See application file for complete search history.

(56) References Cited

U.S. PATENT DOCUMENTS 6,302,010 B1 * 10/2001 Holler ....................... F41H 7/02
296/181.1
2013/0253781 A1 9/2013 Li
2014/0048352 A1 2/2014 Takenawa et al.

FOREIGN PATENT DOCUMENTS

| CN | 103261532 A | 8/2013 |
| CN | 103547484 A | 1/2014 |
| EP | 2428619 A1 | 3/2012 |
| JP | 2003-104055 A | 4/2003 |
| JP | 2005-133529 A | 5/2005 |
| JP | 2005133529 A * | 5/2005 |

(Continued)

Primary Examiner — Tanmay K Shah
(74) Attorney, Agent, or Firm — Drinker Biddle & Reath LLP

(57) ABSTRACT

An operator's compartment is located above a climbing device and has a door. A sensing unit recognizes an operator. A door driving unit automatically opens the door in response the sensing unit sensing the operator.

7 Claims, 11 Drawing Sheets

(56) References Cited

FOREIGN PATENT DOCUMENTS

| | | | |
|---|---|---|---|
| JP | 2005-324664 A | | 11/2005 |
| JP | 2007-120277 A | | 5/2007 |
| JP | 2008-8183 A | | 1/2008 |
| JP | 2008-285910 A | | 11/2008 |
| JP | 2009-114783 A | | 5/2009 |
| JP | 2009-164529 A | | 7/2009 |
| JP | 2009164529 A | * | 7/2009 |
| JP | 2011-117196 A | | 6/2011 |
| JP | 2011117196 A | * | 6/2011 |
| JP | 2013-174046 A | | 9/2013 |
| JP | 2013174046 A | * | 9/2013 |
| KR | 2010-0071363 A | | 6/2010 |
| KR | 2013-0087775 A | | 8/2013 |

* cited by examiner

WORK VEHICLE

TECHNICAL FIELD

The present invention relates to a work vehicle, and particularly to a work vehicle having a climbing device.

BACKGROUND ART

A wheel loader having a climbing device is disclosed for example in Japanese Patent Laying-Open No 2008-008183 (see Patent Document 1). In the wheel loader described in this publication, an operator's compartment (or a cab) having a door is disposed above the climbing device.

CITATION LIST

Patent Document

PTD 1: Japanese Patent Laying-Open No. 2008-008183

SUMMARY OF INVENTION

Technical Problem

In the wheel loader described in the above publication, the operator can easily climb the climb device by climbing the climb device while holding a handrail. However, it is difficult for the operator holding the handrail to open the door, which is large, of the operator's compartment on the climbing device. This makes it difficult for the operator to get into the operator's compartment from the climbing device.

The present invention has been made in view of the above issue. An object of the present invention is to provide a work vehicle allowing an operator to easily get into an operator's compartment from a climbing device.

Solution to Problem

A work vehicle of the present invention comprises a climbing device, an operator's compartment, a sensing unit, and a door driving unit. The operator's compartment is located above the climbing device and has a door. The sensing unit recognizes an operator. The door driving unit automatically opens the door in response the sensing unit sensing the operator.

In the work vehicle, the operator's compartment has a step directly under the door. An entire locus of opening and closing of the door overlaps with the step in a plan view.

In the work vehicle, the door is a foldaway door.

The work vehicle further comprises a storage unit and a control unit. The storage unit has operator information previously stored therein. The control unit controls the door driving unit based on a result of comparing sensed information of an operator sensed by the sensing unit with the operator information stored in the storage unit.

In the work vehicle, the sensing unit senses that an operator steps on the climbing device.

In the work vehicle, the door is automatically closed after the operator gets out of the operator's compartment.

The work vehicle is further comprises a solar panel disposed on an upper surface of the operator's compartment.

Advantageous Effect of Invention

According to the present invention, a door driving unit automatically opens a door in response a sensing unit sensing an operator, and the operator can easily get in an operator's compartment from a climbing device.

DESCRIPTION OF EMBODIMENTS

The present invention will now be described in an embodiment hereinafter with reference to the drawings.

First, a configuration of a wheel loader as an example of a work vehicle in one embodiment of the present invention will be described with reference to FIG. 1, however, the present invention is applicable to a work vehicle, such as a hydraulic excavator, a bulldozer and the like, comprising a cab having a door opening and closing mechanism.

In this example, a positional relationship of each part will be described with reference to an operator seated on an operator's seat in a cab 30. A frontward/rearward direction is a direction frontwardly/rearwardly of the operator seated on the operator's seat. A rightward/leftward direction is a direction rightwardly/leftwardly of the operator seated on the operator's seat. An upward/downward direction is a direction upwardly/downwardly of the operator seated on the operator's seat.

A direction which is opposite to the operator seated on the operator's seat is a frontward direction, and a direction opposite to the frontward direction is a rearward direction. A right side of the operator seated on the operator's seat facing frontward is a rightward direction, and a left side of the operator seated on the operator's seat facing frontward is a leftward direction. A side closer to the feet of the operator seated on the operator's seat is a lower side and a side closer to the head of the operator seated on the operator's seat is an upper side.

Figure 1:
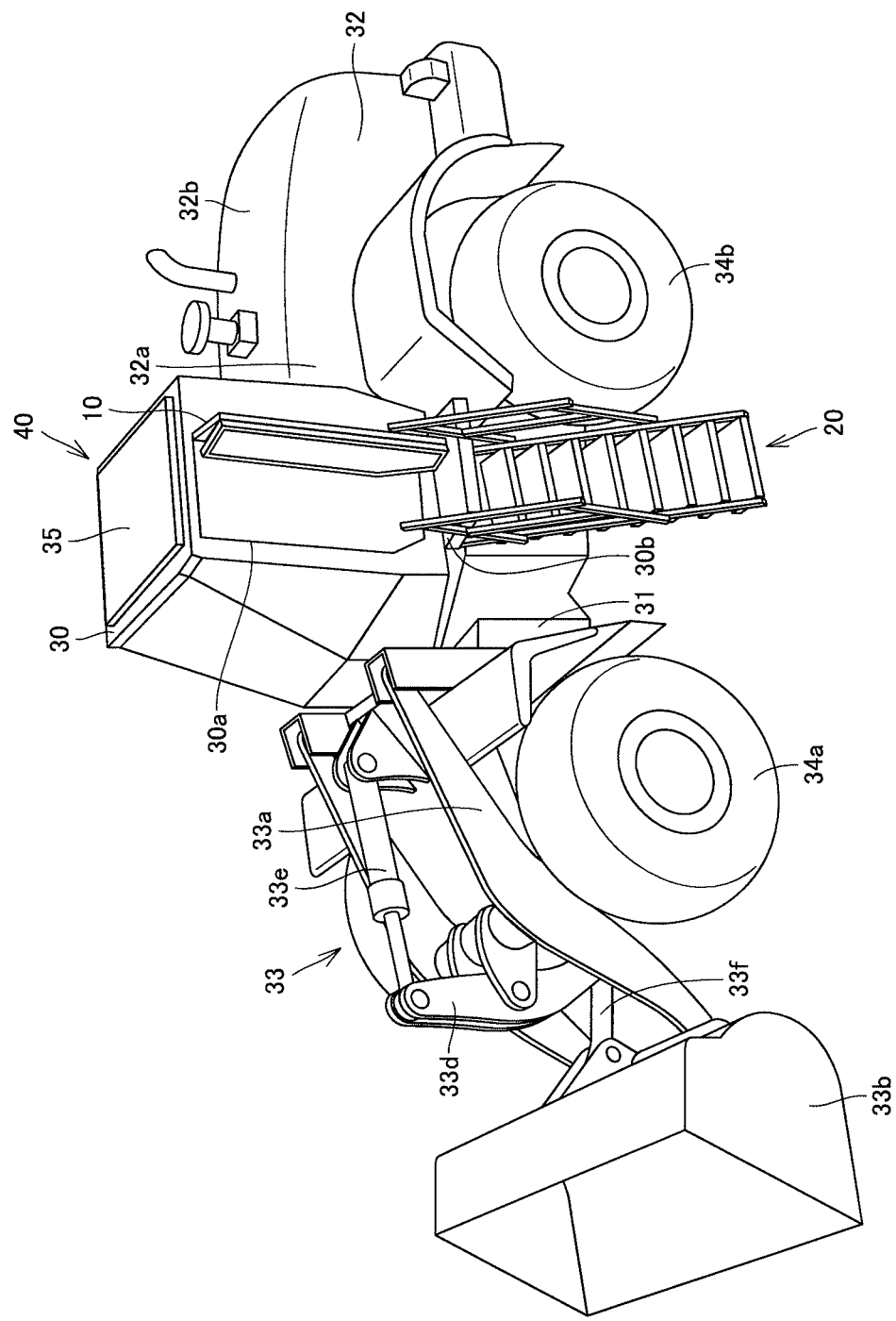
FIG. 1 is a perspective view schematically showing a configuration of a wheel loader in one embodiment of the present invention.

FIG. 1 is a perspective view schematically showing a configuration of a wheel loader according to one embodiment of the present invention. As shown in FIG. 1, a wheel loader 40 according to the present embodiment mainly includes a front frame 31, a rear vehicular body 32, a work implement 33, and a climbing device (or an access system) 20. A front wheel 34a is attached to each of opposite side portions of front frame 31. A rear wheel 34b is attached to each of opposite side portions of rear vehicular body 32.

Front frame 31 and rear vehicular body 32 are attached by a center pin (not shown) so as to be able to swing right and left. Front frame 31 and rear vehicular body 32 constitute an articulated structure.

Specifically, front frame 31 and rear vehicular body 32 are coupled by a pair of right and left steering cylinders (not shown). As the right and left steering cylinders extend and contract, front frame 31 and rear vehicular body 32 swing right and left about the center pin and are thus steered. Front frame 31 and rear vehicular body 32 configure a vehicular body of wheel loader 40.

Work implement 33 is attached in front of front frame 31. Work implement 33 has a pair of booms 33a, a bucket 33b, a pair of boom cylinders (not shown), a bell crank 33d, a bucket cylinder 33e, and a link 33f.

Boom 33a has a proximal end portion attached to front frame 31 so that boom 33a is swingable as desired relative to front frame 31. Bucket 33b is swingably attached to a distal end portion of boom 33a. The boom cylinders couple front frame 31 and boom 33a together. As the boom cylinders extend and contract, boom 33a swings relative to front frame 31.

Bell crank 33d has a substantially center portion supported by boom 33a so that bell crank 33d is swingable as desired relative to boom 33a. Bucket cylinder 33e couples a proximal end portion of bell crank 33d and front frame 31. Link 33f couples a distal end portion of bell crank 33d and bucket 33b. As bucket cylinder 33e extends and contracts, bucket 33b swings relative to boom 33a.

An engine compartment 32b is disposed behind rear vehicular body 32. A hydraulic oil tank 32a is disposed in front of engine compartment 32b. Rear vehicular body 32 has an operator's compartment (e.g., a cab) 30 in front of hydraulic oil tank 32a. Operator's compartment 30 constitutes a space for the operator to enter the compartment and operate wheel loader 40.

Operator's compartment 30 is provided with an opening 30a for a door. Opening 30a for the door connects an internal space of operator's compartment 30 to an external space. Operator's compartment 30 has a door 10. Door 10 is configured to be able to open and close opening 30a for the door.

A solar panel 35 is disposed on an upper portion of operator's compartment 30. Solar panel 35 employs a solar cell to convert solar light directly into electric power to thus generate electric power. A step 30b is attached to a side portion of operator's compartment 30 below opening 30a for the door.

Hereinafter, a configuration of door 10 in wheel loader 40 of the present embodiment will be described with reference to FIG. 2.

Figure 2:
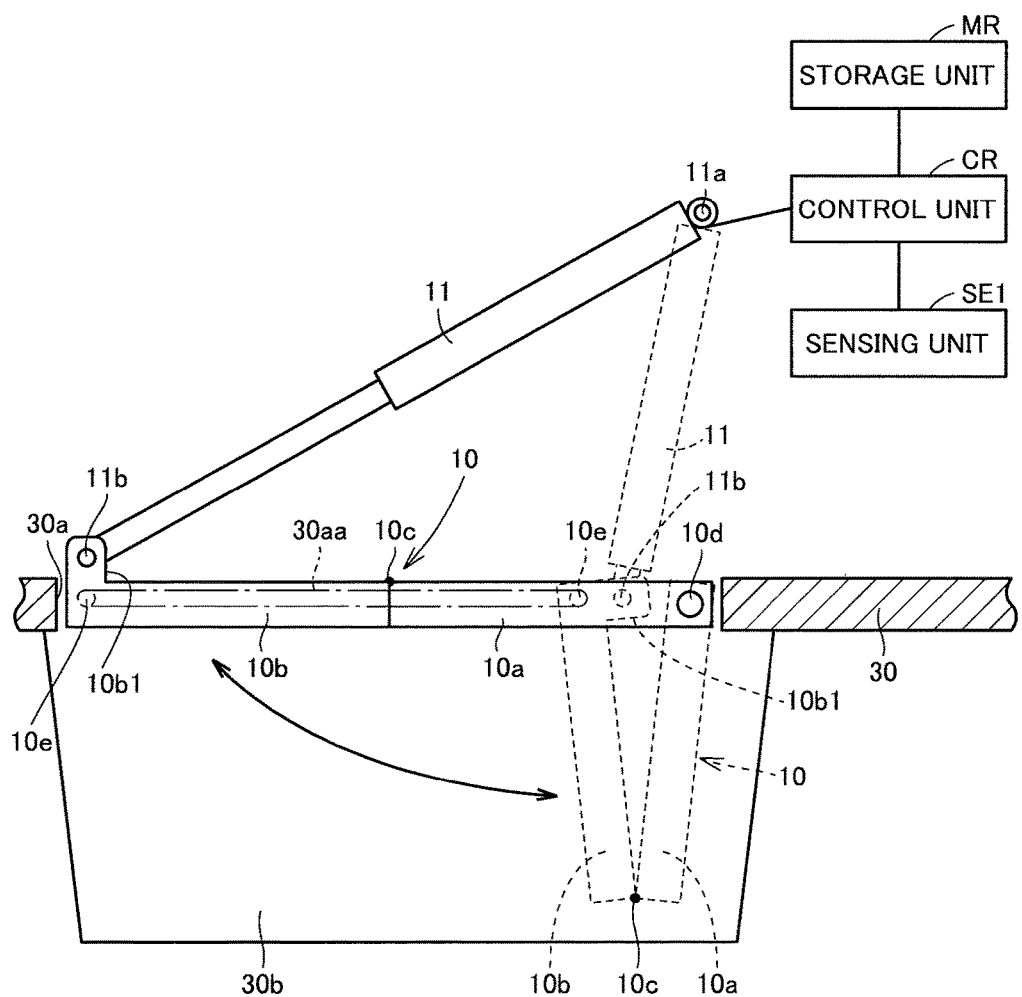
FIG. 2 is a schematic plan view showing an operation of opening and closing a door used in the wheel loader according to one embodiment of the present invention.

FIG. 2 is a schematic plan view showing an operation of opening and closing a door used in a wheel loader according to one embodiment of the present invention. As shown in FIG. 2, door 10 is a foldaway (accordion-type) door, for example.

Door 10 has a plurality of (e.g., two) door panels 10a and 10b. Door panels 10a, 10b each have a frontward/rearward dimension substantially equal to a dimension obtained by dividing a frontward/rearward dimension of opening 30a for the door into a plurality (e.g., two). Door panels 10a, 10b each have an upward/downward dimension substantially equal to an upward/downward dimension of opening 30a for the door.

Door panel 10a is disposed rearwardly of door panel 10b. Door panel 10a has a rear end portion supported with respect to operator's compartment 30 rotatably about a rotation shaft 10d. Thus, door panel 10a is rotatable about rotation shaft 10d to be movable between a position in which opening 30a for the door is closed, as indicated by a solid line, and a position in which door panel 10a has a front end portion projecting toward a space external to operator's compartment 30, as indicated by a broken line.

The front end portion of door panel 10a and a rear end portion of door panel 10b are coupled together with a rotation shaft 10c interposed. Door panel 10a and door panel 10b are relatively rotatable about rotation shaft 10c. Thus, door panels 10a and 10b are mutually rotatable between a state in which they are aligned with each other linearly in the frontward/rearward direction and a state in which they are mutually bent as indicated by a broken line.

A sliding piece 10e is attached to a front end portion of door panel 10b for example. Sliding piece 10e is engaged with a guide rail 30aa slidably along guide rail 30aa. Guide rail 30aa is provided in the vicinity of opening 30a for the door of operator's compartment 30. Further, door panel 10b is supported by operator's compartment 30 rotatably about sliding piece 10e. Thus, door panel 10b is movable between a position in which opening 30a for the door is closed, as indicated by a solid line, and a position in which door panel 10b moves rearward and also has the rear end portion projecting toward a space external to operator's compartment 30, as indicated by a broken line.

Thus, door 10 is movable between a state in which opening 30a for the door is closed, as indicated by a solid line, and a state in which opening 30a for the door is opened, as indicated by a broken line. Door 10 in the state in which opening 30a for the door is opened has door panels 10a and 10b mutually bent and thus configuring a folded shape.

Door 10 can be opened and closed automatically. In order to be able to automatically open and close door 10, a door driving unit 11 is connected to door 10. Door driving unit 11 has one end portion attached to operator's compartment 30 rotatably about a rotation shaft 11a. Door driving unit 11 has the other end portion attached to door panel 10b rotatably about a rotation shaft 11b. Rotation shaft 11b is disposed at the front end portion of door panel 10b in the vicinity of sliding piece 10e in a plan view. Rotation shaft 11b is disposed offset from door panel 10b toward the interior of the operator's compartment. Specifically, door panel 10b has a bent portion 10b1 that is bent so as to extend toward the interior of the operator's compartment with door 10 closed, and the rotation shaft 11b is disposed at bent portion 10b1. Rotation shaft 11b may be formed in one piece with sliding piece 10e.

Driving door driving unit 11 (for example, extending and contracting an electric actuator) allows an operation to open and close door 10. For example, when an electric actuator serving as door driving unit 11 extends, door 10 closes opening 30a for the door, and when the electric actuator contracts, door 10 opens opening 30a for the door. In contrast, door 10 and door driving unit 11 may be configured such that when the electric actuator serving as door driving unit 11 extends, door 10 may open opening 30a for the door, and when the electric actuator contracts, door 10 may close opening 30a for the door. Note that the electric actuator may be replaced with a hydraulic cylinder.

In the present embodiment, wheel loader 40 further includes a control unit CR, a sensing unit SE1, and a storage unit MR. Control unit CR is connected to door driving unit 11. Control unit CR serves to control an operation of door driving unit 11. Control unit CR for example includes a drive control unit, and the drive control unit drivably controls the electric actuator serving as door driving unit 11. When the electric actuator is replaced with a hydraulic cylinder, control unit CR for example includes a hydraulic pump and a control valve, and the hydraulic cylinder is drivably controlled by an operation of the hydraulic pump and control valve.

Sensing unit SE1 is connected to control unit CR. Sensing unit SE1 serves to sense an operator. In response to sensing unit SE1 sensing the operator, control unit CR controls an operation of door driving unit 11.

By an operation of door driving unit 11, door 10 is operated to automatically open opening 30a for the door. Furthermore, by an operation of door driving unit 11, door 10 is operated to automatically close opening 30a for the door. For example, sensing unit SE1 may be a camera, a microphone, a contact sensor, a load sensor, a smart key receiver, and the like singly or in any combination thereof.

The camera as sensing unit SE1 is attached to an upper portion of operator's compartment 30, for example. The contact sensor is attached for example to climbing device 20 at a handrail portion 22. When an operator who is going to get in the vehicle touches handrail portion 22 of climbing device 20, the contact sensor can sense the operator. The load sensor is attached to climbing device 20 for example. When the operator steps on climbing device 20, the load sensor can sense the operator. The smart key receiver makes a pair with a smart key.

The smart key is a portable wireless key, and the work vehicle and the smart key are provided with a short-distance wireless function and door 10 is locked and unlocked by wireless communications between the work vehicle and the smart key. When the smart key receiver senses the smart key carried by the operator with him/her, the operator can be sensed.

Sensing unit SE1 may sense the operator before the operator steps on climbing device 20, or may sense the operator after the operator steps on climbing device 20.

Storage unit MR is connected to control unit CR. Storage unit MR has operator information previously stored therein. Control unit CR may control door driving unit 11 based on a result of comparing sensed information of the operator sensed by sensing unit SE1 with the operator information stored in storage unit MR. This allows individual authentication of an operator who is going to get in wheel loader 40.

When sensing unit SE1 is for example a camera, control unit CR compares an image of the operator picked up by the camera with the operator information (or an image) stored in storage unit MR. If as a result of the comparison it is determined that the operator who is going to get in the vehicle is a previously registered operator, door driving unit 11 may be driven to control and thus open door 10.

When sensing unit SE1 is for example a microphone, control unit CR compares a voice print of the operator collected by the microphone with the operator information (or a voice print) stored in storage unit MR. If as a result of the comparison it is determined that the operator who is going to get in the vehicle is a previously registered operator, door driving unit 11 may be driven to control and thus open door 10.

When sensing unit SE1 is for example a contact sensor, control unit CR compares a feature of the operator obtained by the sensor with the operator information stored in storage unit MR. If as a result of the comparison it is determined that the operator who is going to get in the vehicle is a previously registered operator, door driving unit 11 may be driven to control and thus open door 10.

When sensing unit SE1 is for example a smart key receiver, control unit CR compares information of a smart key received by the smart key receiver (or sensed information of the operator) with the operator information (or information of the smart key) stored in storage unit MR. If as a result of the comparison it is determined that the smart key matches the information of the smart key previously registered, door driving unit 11 may be driven to control and thus open door 10.

Hereinafter, a configuration of climbing device 20 in wheel loader 40 of the present embodiment will be described with reference to FIGS. 3 and 4.

Figure 3:
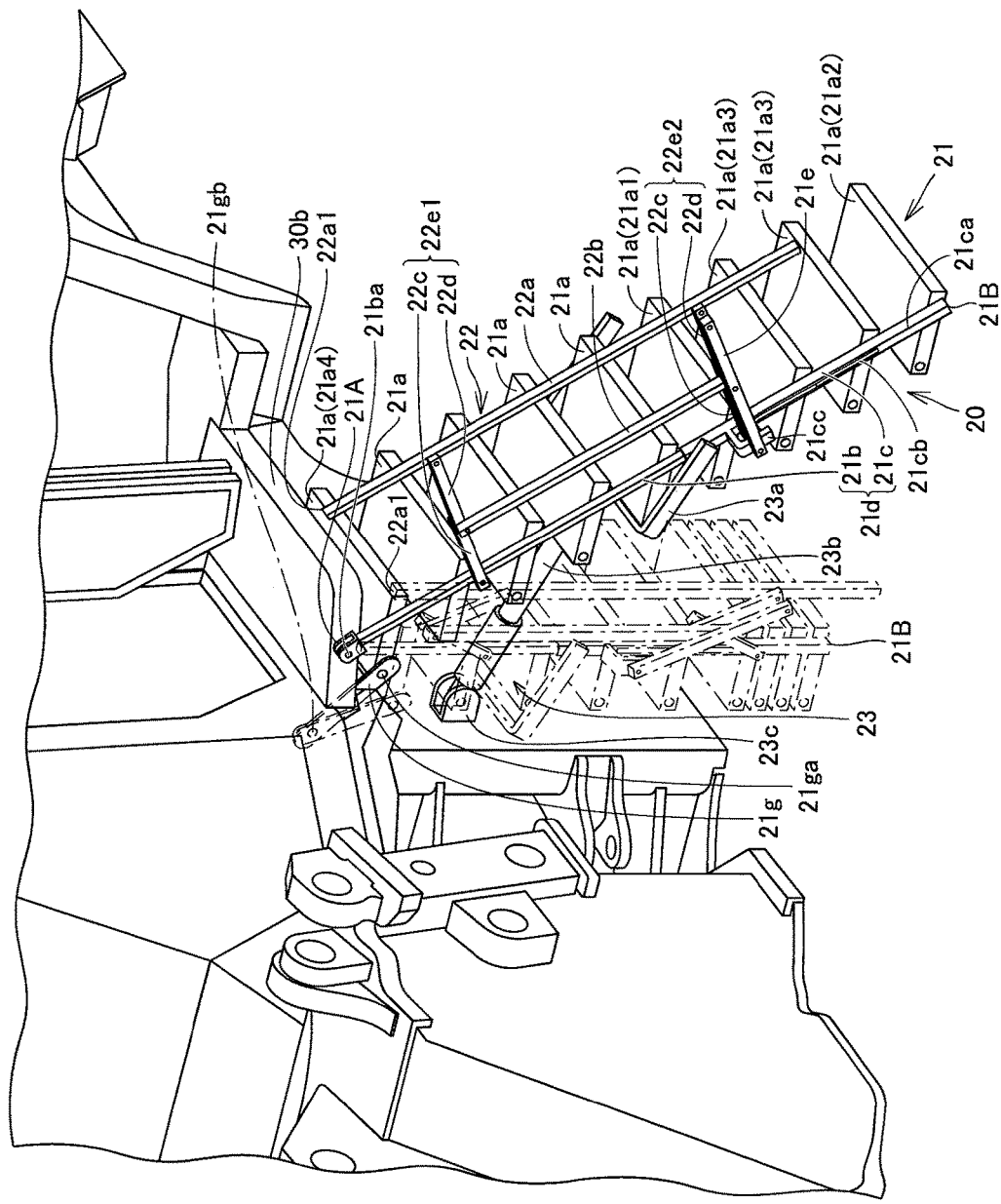
FIG. 3 is a schematic perspective view showing an operation of deploying/retracting a climbing device used in the wheel loader according to one embodiment of the present invention, as seen from a left front side.
Figure 4:
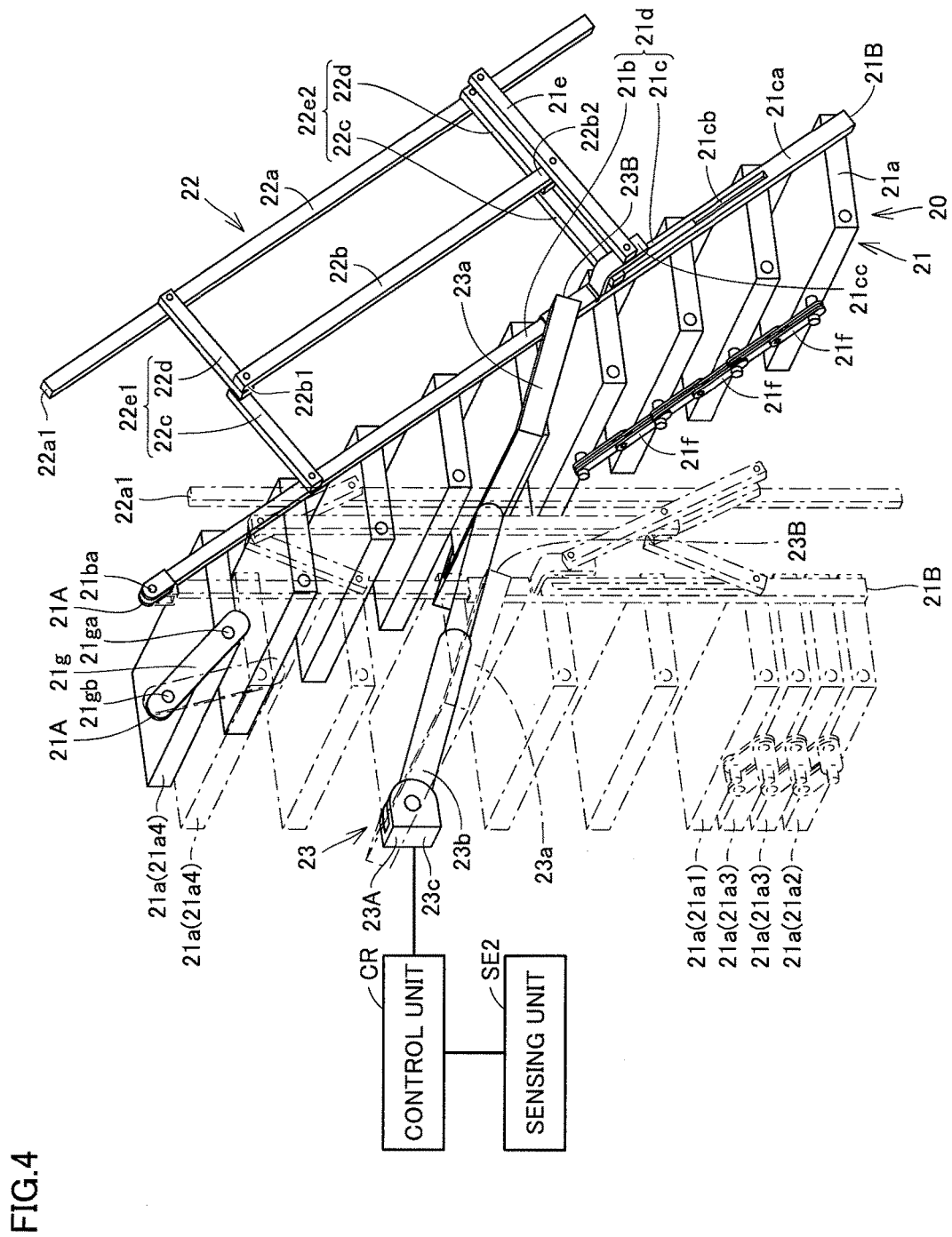
FIG. 4 is a schematic perspective view showing the operation of deploying/retracting the climbing device shown in FIG. 3 from a right front side.

FIGS. 3 and 4 are schematic perspective views showing an operation of deploying/retracting the climbing device used in the wheel loader according to one embodiment of the present invention, as seen from a left front side and a right front side, respectively. Note that in FIGS. 3 and 4, a pair of right and left handrail portions 22, a pair of right and left side members 21d, and a pair of right and left pivoting members 21g have only one handrail portion 22, one side member 21d, and one pivoting member 21g, respectively, shown and have the other handrail portion 22, the other side member 21d, and the other pivoting member 21g, respectively, unshown. Further, in FIGS. 3 and 4, a deployed position is indicated by a solid line, and a retracted position is indicated by a broken line. Directions rightwardly and leftwardly of a climbing device body 21 included in climbing device 20 correspond to directions frontwardly and rearwardly of wheel loader 40.

As shown in FIGS. 3 and 4, climbing device 20 mainly includes climbing device body 21, a pair of right and left handrail portions (a handrail) 22, and a support member 23.

Climbing device body 21 has a pair of right and left first end portions 21A and a pair of right and left second end portions 21B. Climbing device body 21 is attached to the vehicular body of wheel loader 40 at first end portion 21A so as to be driven rotatably with respect to the vehicular body.

In FIGS. 3 and 4, as has been set forth above, the pair of right and left side members 21d has only one side member 21d alone shown. Accordingly, in FIGS. 3 and 4, the pair of right and left first end portions 21A has only one first end portion 21A shown, and the pair of right and left second end portions 21B has only one second end portion 21B shown.

As climbing device body 21 is rotatably driven, it can assume a retracted position and a deployed position (or a position for use). In the retracted position, climbing device body 21 is erected such that first end portion 21A is positioned above and second end portion 21B is positioned below. In the deployed position, climbing device body 21 is inclined such that second end portion 21B is located outer than first end portion 21A on a lateral side of the vehicle.

Climbing device body 21 mainly has a plurality of step portions 21a, a pair of right and left side members 21d, a connection member 21e, an auxiliary link member 21f, and a pivoting member 21g. The plurality of step portions 21a are each a portion serving as a step when the operator climbs up and down climbing device body 21. The plurality of step portions 21a are aligned upward/downward side by side.

Of the plurality of steps, an uppermost step portion 21a4 located closest to first end portion 21A is connected to the vehicular body via the pair of right and left pivoting members 21g. Pivoting member 21g is connected to uppermost step portion 21a4 rotatably about a rotation shaft 21ga. Furthermore, pivoting member 21g is connected to the vehicular body rotatably about a rotation shaft 21gb.

The pair of right and left side members 21d is connected to each of the plurality of step portions 21a. The pair of right and left side members 21d sandwich the plurality of step portions 21a. A ladder is composed of the plurality of step portions 21a and the pair of right and left side members 21d.

The paired right and left side members 21d each have a first member 21b and a second member 21c. First member 21b extends linearly. First member 21b has an upper end attached to step 30b of operator's compartment 30 rotatably about a rotation shaft 21ba.

Second member 21c has a linear tubular portion 21ca and a projecting portion 21cc. Tubular portion 21ca is composed of a tube which has an inner diameter larger than an outer diameter of first member 21b. First member 21b has a lower end partially inserted into tubular portion 21ca.

With first member 21b inserted in tubular portion 21ca of second member 21c, second member 21c can be slid relative to first member 21b. Such sliding can change an entire longitudinal length of first member 21b and second member 21c (i.e., a length of side member 21d). When climbing device body 21 assumes the deployed position, side member 21d is relatively long, whereas when climbing device body 21 assumes the retracted position, side member 21d is relatively short.

The plurality of step portions 21a have a first step portion 21a1, a second step portion 21a2, and a third step portion 21a3. First step portion 21a1 is a step portion of the plurality of step portions 21a disposed at a side of first member 21b closest to second end portion 21B, and first step portion 21a1 is attached to first member 21b rotatably. Second step portion 21a2 is a step portion of the plurality of step portions 21a disposed at a side of second member 21c closest to second end portion 21B, and second step portion 21a2 is attached to second member 21c rotatably. Third step portion 21a3 is attached to second member 21c between first step portion 21a1 and second step portion 21a2 slidably and rotatably. In the present embodiment, two third step portions 21a3 are disposed between first step portion 21a1 and second step portion 21a2.

Note that any step portion 21a connected to first member 21b excluding first step portion 21a1 is connected to first member 21b rotatably.

Third step portion 21a3 is connected by auxiliary link member 21f to at least one of first step portion 21a1 and second step portion 21a2. In the present embodiment, one of two third step portions 21a3 is connected to first step portion 21a1 by auxiliary link member 21f. Furthermore, the other of two third step portions 21a3 is connected to second step portion 21a2 by auxiliary link member 21f. Furthermore, two third step portions 21a3 are also connected by auxiliary link member 21f.

Auxiliary link member 21f has a so-called rhombic link mechanism. The rhombic link mechanism has a configuration in which four linking pieces are assembled in a rhombic shape so that the four linking pieces are rotatable relative to each other. When climbing device body 21 assumes the deployed position, auxiliary link member 21f linearly extends, whereas when climbing device body 21 assumes the retracted position, auxiliary link member 21f is retracted in the form of a rhombus. Accordingly, when climbing device body 21 assumes the deployed position, first, second and third step portions 21a1, 21a2 and 21a3 are positioned away from one another, whereas when climbing device body 21 assumes the retracted position, first, second and third step portions 21a1, 21a2 and 21a3 are positioned close to one another.

Tubular portion 21ca of second member 21c has an opening 21cb formed in a longitudinal direction thereof. Projecting portion 21cc is connected to tubular portion 21ca at a side of opening 21cb closer to first end portion 21A. Projecting portion 21cc projects sideway of tubular portion 21ca. Connection member 21e has one end portion rotatably supported by projecting portion 21cc (or second member 21c). Accordingly, one end portion of connection member 21e connected to projecting portion 21cc is slidable relative to first member 21b.

The pair of right and left handrail portions 22 is attached to side member 21d of climbing device body 21. The pair of right and left handrail portions 22 has a gripping portion 22a, a pair of link members 22e1 and 22e2, and a coupling piece 22b.

Gripping portion 22a is a portion gripped by an operator climbing up and down climbing device body 21. The pair of link members 22e1 and 22e2 support gripping portion 22a to climbing device body 21. Gripping portion 22a is supported by the pair of link members 22e1 and 22e2 to side member 21d such that gripping portion 22a is parallel to side member 21d.

Paired link members 22e1 and 22e2 each have a first link piece 22c and a second link piece 22d. Paired link members 22e1 and 22e2 each have first link piece 22c attached to climbing device body 21 rotatably.

More specifically, one link member 22e1 has first link piece 22c attached to first member 21b rotatably. The other link member 22e2 also has first link piece 22c attached to first member 21b rotatably. The other link member 22e2 has first link piece 22c attached to first member 21b slidably along opening 21cb of second member 21c relative to second member 21c.

Paired link members 22e1 and 22e2 each have second link piece 22d attached to first link piece 22c and gripping portion 22a rotatably.

Coupling piece 22b has one end 22b1 and the other end 22b2. Coupling piece 22b has one end 22b1 connected to one link member 22e1 at a first connecting portion connecting first link piece 22c and second link piece 22d together. Coupling piece 22b is rotatable relative to both first link piece 22c and second link piece 22d of one link member 22e1.

Coupling piece 22b has the other end 22b2 connected to the other link member 22e2 at a second connecting portion connecting first link piece 22c and second link piece 22d together. Coupling piece 22b is rotatable relative to both first link piece 22c and second link piece 22d of the other link member 22e2.

First member 21b of side member 21d, coupling piece 22b, first link piece 22c of one link member 22e1, and first link piece 22c of the other link member 22e2 configure a first rectangular link mechanism. Furthermore, gripping portion 22a, coupling piece 22b, second link piece 22d of one link member 22e1, and second link piece 22d of the other link member 22e2 configure a second rectangular link mechanism.

Connection member 21e has one end portion rotatably supported by projecting portion 21cc of second member 21c. Connection member 21e has the other end portion attached to gripping portion 22a together with second link piece 22d of the other link member 22e2 rotatably.

Connection member 21e has the other end portion connected to a connecting portion connecting gripping portion 22a and second link piece 22d of the other link member 22e2. Furthermore, connection member 21e has a center portion connected to a connecting portion connecting the three members of coupling piece 22b, and first link piece 22c and second link piece 22d of the other link member 22e2. Thus, connection member 21e is rotatable relative to gripping portion 22a, coupling piece 22b, and first link piece 22c of the other link member 22e2.

Handrail portion 22 operates in a manner engaged with a rotation operation of climbing device body 21. When climbing device body 21 assumes the deployed position, handrail portion 22 is in a raised state, whereas when climbing device body 21 assumes the retracted position, handrail portion 22 is in a folded state.

In the raised state, gripping portion 22a assumes a first position distant from climbing device body 21. In the folded state, gripping portion 22a assumes a second position closer to climbing device body 21 than when in the raised state.

Climbing device body 21 is movable between the retracted position and the deployed position by support member 23. Support member 23 has one end portion 23A and the other end portion 23B. Support member 23 has one end portion 23A attached to the vehicular body. Support member 23 has the other end portion 23B attached to second member 21c rotatably. A distance between one end portion 23A and the other end portion 23B of support member 23 can be extended and contracted.

Support member 23 has a connection member 23a, a driving member 23b, and a fixture 23c. Connection member 23a is rotatably attached to second member 21c. Fixture 23c is attached to the vehicular body. Driving member 23b can be extended and contracted, and is composed for example of an electric actuator. Driving member 23b may be composed of a hydraulic cylinder rather than an electric actuator. As driving member 23b extends and contracts, a distance between the one end portion 23A and the other end portion 23B of support member 23 can be extended and contracted. Climbing device body 21 can thus be moved between the retracted position and the deployed position.

As shown in FIG. 4, control unit CR is connected to driving member 23b. Control unit CR serves to control an operation of driving member 23b. Control unit CR for example includes a drive control unit, and the drive control unit drivably controls an electric actuator serving as driving member 23b. When the electric actuator is replaced with a hydraulic cylinder, control unit CR for example includes a hydraulic pump and a control valve, and the hydraulic cylinder is drivably controlled by an operation of the hydraulic pump and control valve.

A sensing unit SE2 is connected to control unit CR. When climbing device body 21 has its position changed from the retracted position to the deployed position, a sensor for sensing that wheel loader 40 is stopped, a sensor for sensing that a parking switch is turned on, a sensor for sensing that a door opening/closing switch is turned on, a sensor for sensing that a switch operated to deploy climbing device body 21 is turned on, etc. are used singly or in any combination as sensing unit SE2.

Furthermore, when climbing device body 21 has its position changed from the deployed position to the retracted position, a load sensor for load on driving member 23b, a camera, a seating sensor provided in operator's compartment 30 at the operator's seat for sensing that an operator is seated, a seat belt sensor for sensing that a seat belt is fastened, a sensor for sensing that a key switch (an engine starting switch) is turned on, etc. are used singly or in any combination as sensing unit SE2.

Hereinafter, an operation of climbing device 20 will be described. Initially, the retracted position will be described with reference to FIG. 3 and FIG. 4.

As shown in FIGS. 3 and 4, in the retracted position, climbing device body 21 is erected such that first end portion 21A is positioned above and second end portion 21B is positioned below.

In the retracted position, support member 23 has driving member 23b in a contracted state. As a result, first member 21b has a considerable amount inserted in tubular portion 21ca of second member 21c, and side member 21d is in a contracted state. Further, auxiliary link member 21f is in a rhombic shape and hence in a contracted state. Accordingly, a distance between first step portion 21a1 and second step portion 21a2, a distance between second step portion 21a2 and third step portion 21a3, and a distance between third step portions 21a3 are smaller than a distance between step portions 21a connected to first member 21b in the retracted position.

Furthermore, in the retracted position, side member 21d and coupling piece 22b are inclined relative to first link piece 22c of each of one link member 22e1 and the other link member 22e2. Furthermore, side member 21d and coupling piece 22b are parallel, and first link pieces 22c are also parallel. Accordingly, the first rectangular link mechanism (side member 21d, coupling piece 22b, and first link piece 22c) has a shape of a parallelogram other than an oblong.

Furthermore, in the retracted position, gripping portion 22a and coupling piece 22b are inclined relative to second link piece 22d of each of one link member 22e1 and the other link member 22e2. Furthermore, gripping portion 22a and coupling piece 22b are parallel, and second link pieces 22d are also parallel. Accordingly, the second rectangular link mechanism (gripping portion 22a, coupling piece 22b, and second link piece 22d) has a shape of a parallelogram other than an oblong.

In the retracted position, one link member 22e1 has first link piece 22c and second link piece 22d extending in mutually transverse directions. Furthermore, the other link member 22e2 has first link piece 22c and second link piece 22d extending in mutually transverse directions.

Thus the first and second rectangular link mechanisms each have a shape of a parallelogram other than an oblong and are in a folded state. In the retracted position, gripping portion 22a has an upper end 22a1 located below step 30b attached to operator's compartment 30.

When the retracted position is shifted to the deployed position, driving member 23b is extended. Thus, climbing device body 21 assumes the deployed position such that it is inclined such that second end portion 21B is located outer than first end portion 21A on a lateral side of the vehicle.

On this occasion, side member 21d rotates relative to the vehicular body about rotation shafts 21ba and 21gb. Furthermore, second member 21c slides relative to first member 21b, and side member 21d extends. This increases a distance between first step portion 21a1 and second step portion 21a2, and auxiliary link member 21f is deformed from a rhombic shape to a linear shape.

As auxiliary link member 21f is deformed into the linear shape, third step portion 21a3 between first step portion 21a1 and second step portion 21a2 also moves. This increases a distance between third step portion 21a3 and first step portion 21a1, a distance between third step portion 21a3 and second step portion 21a2, and a distance between third step portions 21a3.

Furthermore, as second member 21c slides relative to first member 21b, connection member 21e is rotated relative to second member 21c and thus raised. As connection member 21e is raised, the other link member 22e2 also has first link piece 22c and second link piece 22d rotated relative to second member 21c and thus raised.

As connection member 21e is thus raised, handrail portion 22 shifts from the folded state to the raised state. Climbing device body 21 thus shifts from the retracted position to the deployed position.

In the deployed position, support member 23 has driving member 23b in an extended state. As a result, first member 21b has a shorter length inserted in tubular portion 21ca of second member 21c than when in the retracted position, and side member 21d is in an extended state.

Further, auxiliary link member 21f is in a linear shape and hence in an extended state. Accordingly, a distance between first step portion 21a1 and third step portion 21a3, a distance between second step portion 21a2 and third step portion 21a3, and a distance between third step portions 21a3 are substantially equal to a distance between step portions 21a connected to the first member in the deployed position.

In the deployed position, side member 21d and coupling piece 22b are substantially orthogonal to first link piece 22c of each of one link member 22e1 and the other link member 22e2. Furthermore, side member 21d and coupling piece 22b are parallel, and first link pieces 22c are also parallel. Accordingly, the first rectangular link mechanism has a substantially oblong shape.

Furthermore, in the deployed position, gripping portion 22a and coupling piece 22b are substantially orthogonal to second link piece 22d of each of one link member 22e1 and the other link member 22e2. Furthermore, gripping portion 22a and coupling piece 22b are parallel, and second link pieces 22d are also parallel. Accordingly, the second rectangular link mechanism has a substantially oblong shape.

In the deployed position, one link member 22e1 has first link piece 22c and second link piece 22d disposed collinearly. Furthermore, the other link member 22e2 has first link piece 22c and second link piece 22d disposed collinearly.

When the deployed position is shifted to the retracted position, driving member 23b is contracted. This causes an operation opposite to shifting from the retracted position to the deployed position as described above and climbing device body 21 thus assumes the retracted position.

Hereinafter will be described how door 10 is controlled to be opened and closed and how climbing device 20 is controlled to be contracted and deployed when an operator gets in and out of wheel loader 40. Initially, a control applied when the operator gets in wheel loader 40 will be described with reference to FIGS. 5-8.

Figure 5:
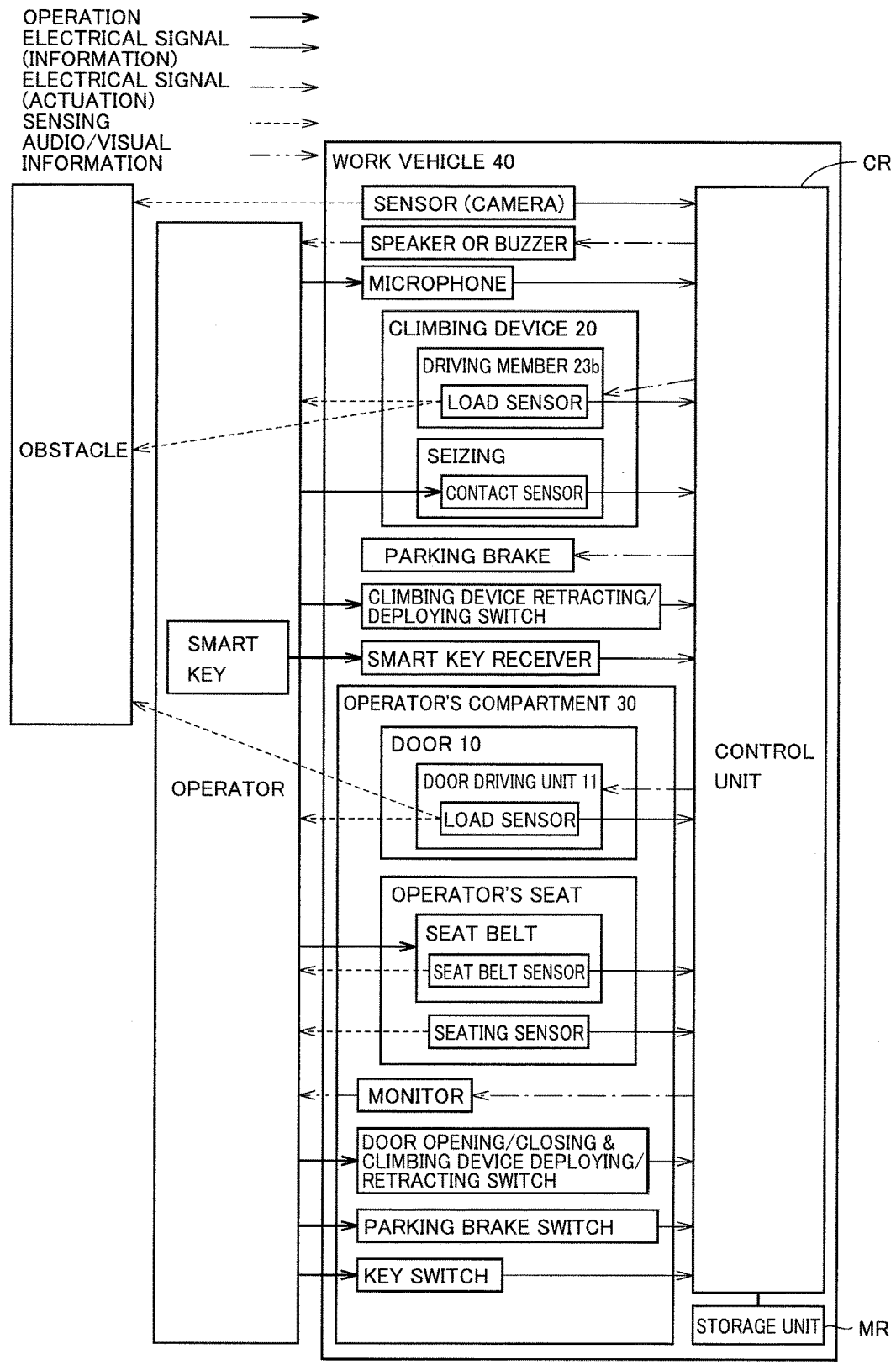
FIG. 5 is a functional block diagram for illustrating an operation of the climbing device and the door in the wheel loader according to one embodiment of the present invention.
Figure 6:
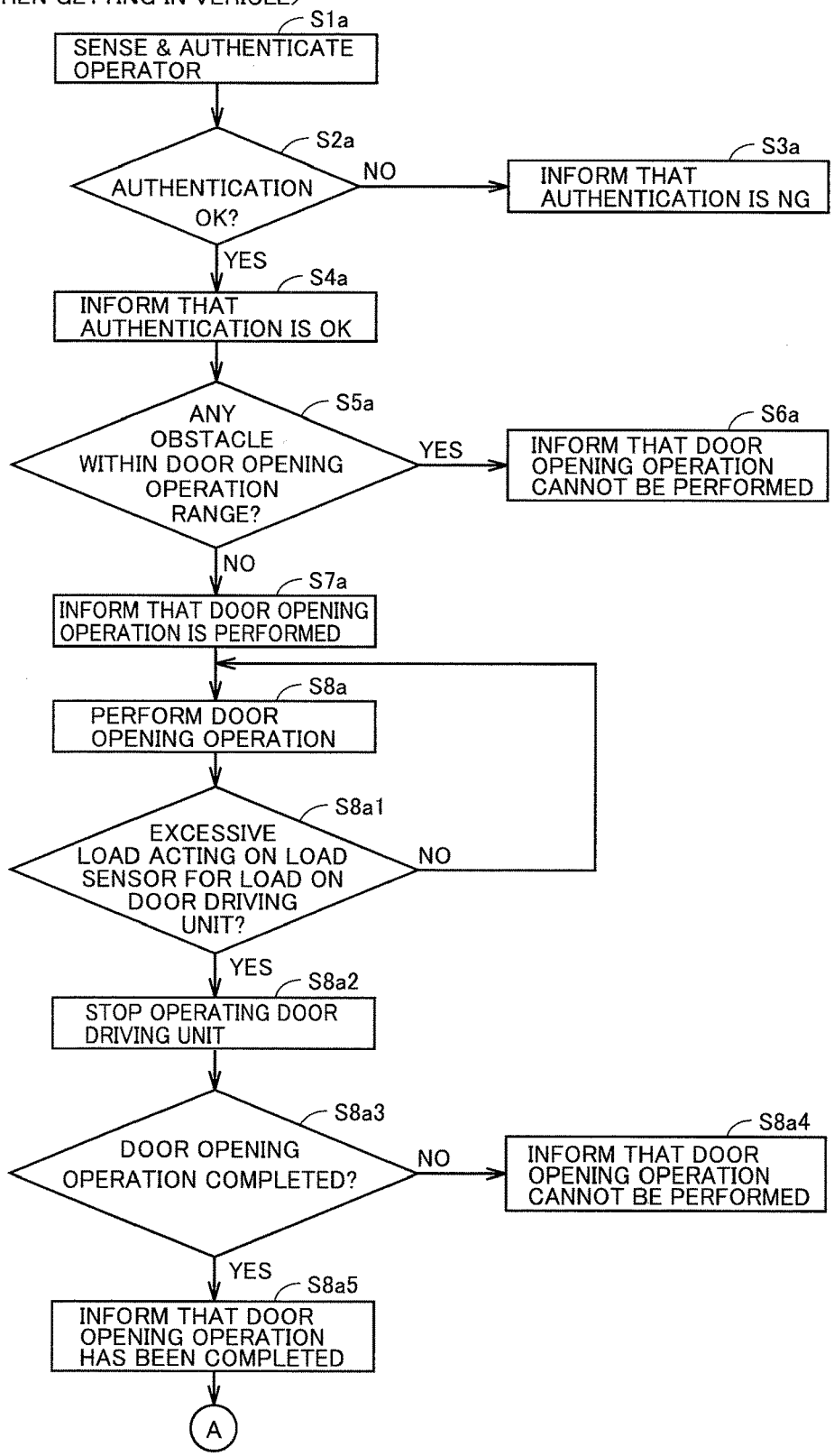
FIG. 6 is a first flowchart indicating a door opening/closing operation and a climbing device retracting/deploying operation performed when an operator gets in the vehicle.
Figure 7:
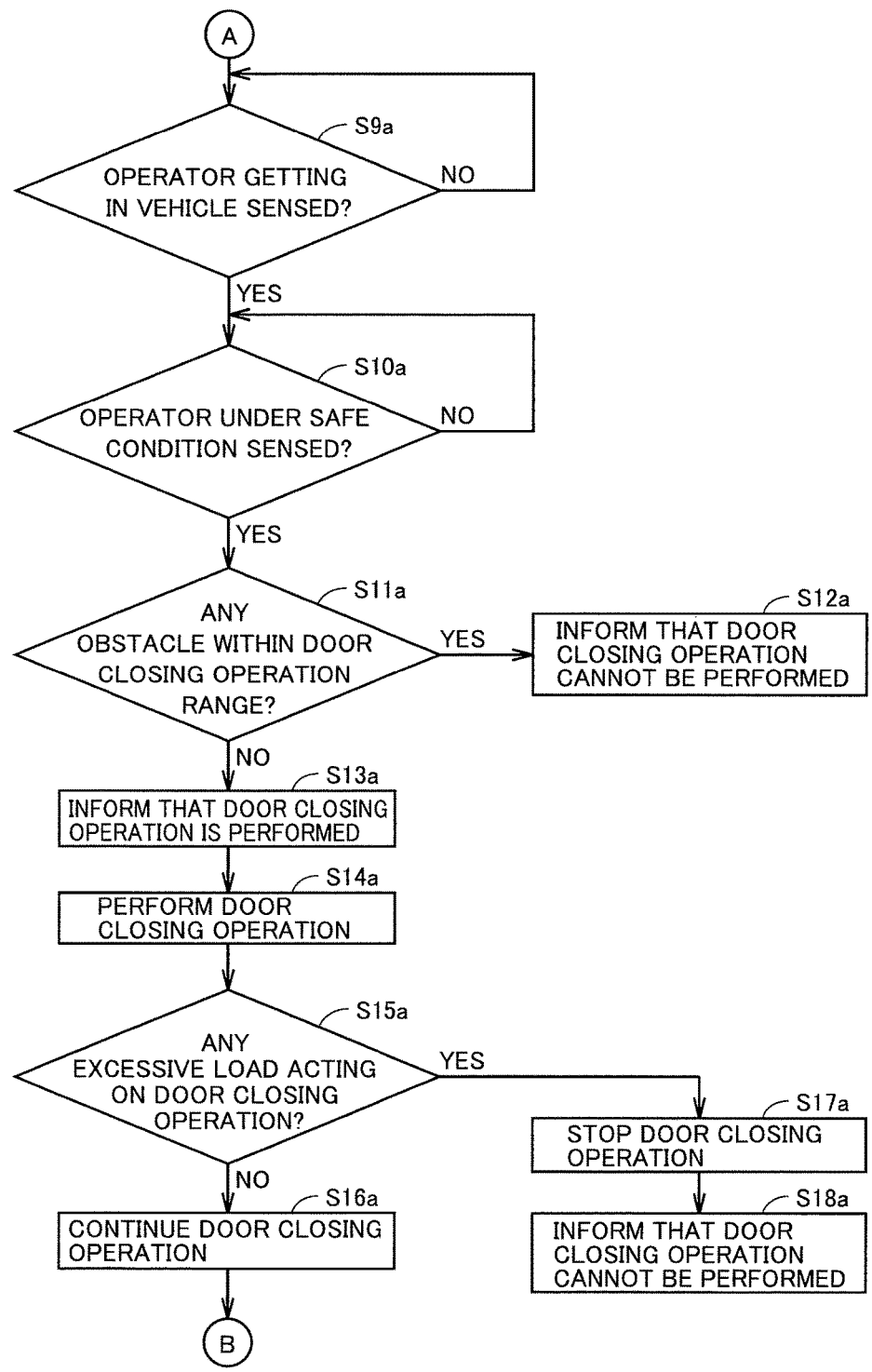
FIG. 7 is a second flowchart indicating the door opening/closing operation and the climbing device retracting/deploying operation performed when the operator gets in the vehicle.
Figure 8:
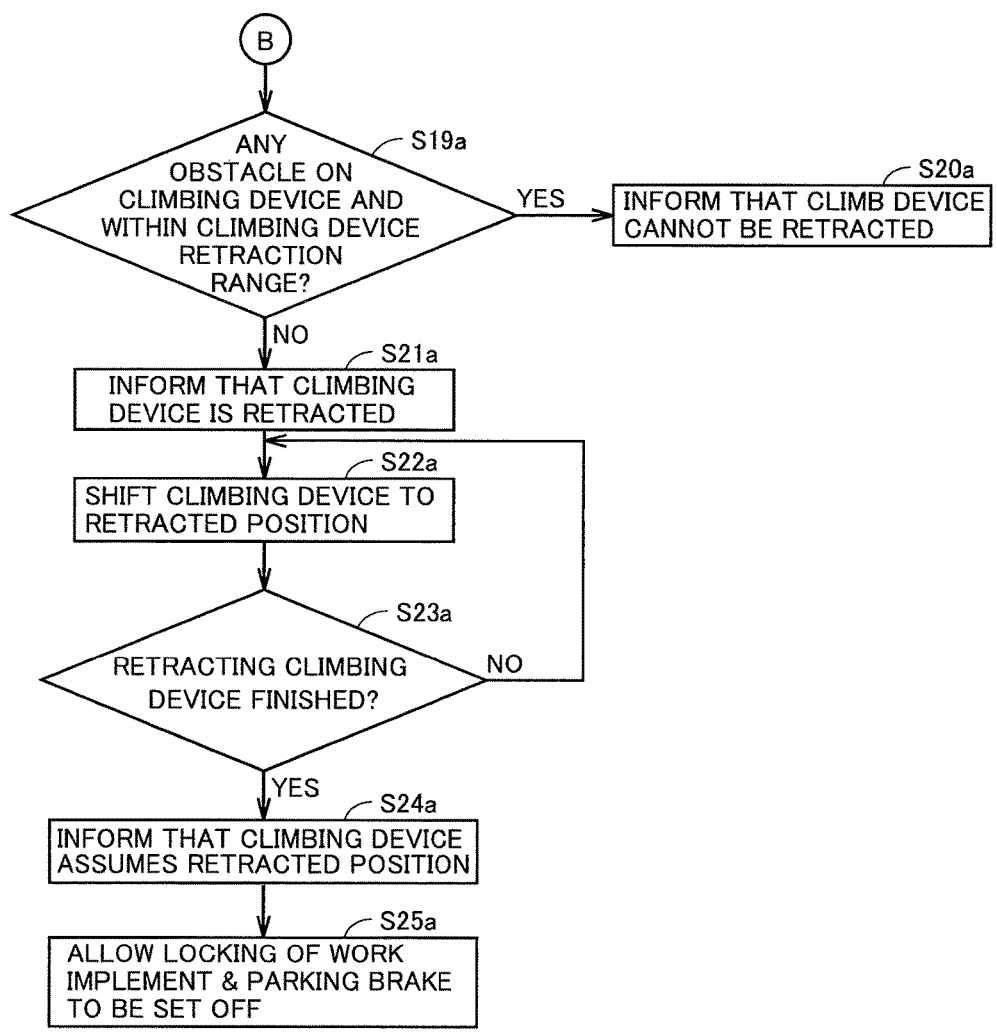
FIG. 8 is a third flowchart indicating the door opening/closing operation and the climbing device retracting/deploying operation performed when the operator gets in the vehicle.

FIG. 5 is a functional block diagram for illustrating an operation of the climbing device and the door in the wheel loader according to one embodiment of the present invention. FIGS. 6-8 are flowcharts indicating a door opening/closing operation and a climbing device retracting/deploying operation performed when the operator gets in the vehicle.

Wheel loader 40 is stopped and climbing device body 21 is in a deployed state. In this state, as shown in FIG. 5 and FIG. 6, a sensor mounted on wheel loader 40 senses that an operator approaches wheel loader 40 or steps on climbing device body 21, and personal authentication is performed (step S1a). This sensor is for example a camera, a microphone, a contact sensor, or a smart key receiver.

When the sensor is for example a camera, control unit CR performs authentication by comparing an image of the operator picked up by the camera with operator information (or an image) stored in storage unit MR.

When the sensor is for example a microphone, control unit CR performs authentication by comparing a voice print of the operator collected by the microphone with the operator information (or a voice print) stored in storage unit MR.

When the sensor is for example a contact sensor provided to climbing device 20, control unit CR performs authentication by comparing a feature of the operator obtained by the sensor with the operator information stored in storage unit MR.

When the sensor is for example a smart key receiver, control unit CR performs authentication by comparing information of a smart key received by the smart key receiver (or sensed information of the operator) with the operator information (or information of the smart key) stored in storage unit MR.

Whether or not the operator (or the smart key) matches the information of the operator (or the smart key) stored in storage unit MR is determined by the above authentication (step S2a).

As a result of the authentication, if the operator (or the smart key) does not match the operator (or the smart key) stored in storage unit MR, the operator is accordingly informed for example by a sound through a speaker, a buzzer sound, etc. (Step S3a). As a result of the authentication, if the operator (or the smart key) matches the operator (or the smart key) stored in storage unit MR, the operator is accordingly informed for example by a sound through a speaker, a buzzer sound, etc. (Step S4a).

Thereafter, whether or not there is an obstacle within a range of an operation of opening/closing door 10 is sensed by a sensor (e.g., a camera), and determined by control unit CR (step S5a). When it is determined that there is an obstacle, the operator is notified by a sound through a speaker, a buzzer sound, etc. that an operation to open door 10 cannot be performed (step S6a).

When it is determined that there is no such obstacle, the operator is notified by a sound through a speaker, a buzzer sound, etc. that an operation to open door 10 is performed (step S7a). Subsequently, door driving unit 11 is activated to perform the operation to open door 10 (step S8a).

The operation to open door 10 is performed by retracting door driving unit 11 (e.g., a hydraulic cylinder), as shown in FIG. 2.

Thereafter, whether or not there is a trouble in door driving unit 11 in opening and closing door 10 is sensed for example by the load sensor for load on the driving unit, and determined by control unit CR (step S8a1). If there is no excessive load acting on door driving unit 11, the operation to open door 10 is continued. If there is an excessive load acting on door driving unit 11, door driving unit 11 is inactivated (step S8a2).

Then, control unit CR determines from a length of door drive unit 11 or the like whether or not an operation of opening door 10 is completed (step S8a3). If the operation to open door 10 has not been completed, the operator is informed audibly or the like that the operation to open door 10 cannot be performed due to an excessive load (step S8a4).

Once the operation of opening door 10 has been completed, the operator is notified accordingly (step S8a5). Once the operation of opening door 10 has been completed, the operator climbs climbing device 20 while holding handrail portion 22, and after the operator has finished climbing climbing device 20, the operator enters operator's compartment 30 through door 10 opened (i.e., gets in the vehicle).

As shown in FIGS. 5 and 7, whether or not the operator has got into operator's compartment 30 is sensed by a getting-in sensor and determined by control unit CR (step S9a). The getting-in sensor is for example a camera, a load sensor for load on driving member 23b, or the like.

When the getting-in sensor is for example a camera, control unit CR determines whether or not the operator has got in the vehicle based on an image of the operator picked up by the camera. When the getting-in sensor is for example a load sensor for load on driving member 23b, control unit CR determines whether or not the operator has got in the vehicle based on a signal of the load sensor sensing a load received by climbing device 20.

When it is determined that the operator has got in the vehicle, whether or not the operator is under a safe condition is sensed by a state sensor and determined by control unit CR (step S10a). The state sensor is for example a seating sensor for sensing that an operator is seated, a seat belt sensor for sensing that a seat belt is fastened, a switch operated to retract/deploy climbing device 20, and/or the like.

When the state sensor is for example the seating sensor, control unit CR determines whether or not the operator is under a safe condition based on a signal of the seating sensor sensing that the operator has seated himself/herself in the operator's seat.

When the state sensor is for example the seat belt sensor, control unit CR determines whether or not the operator is under a safe condition based on a signal of the seat belt sensor sensing that the operator has fastened the seat belt.

When the state sensor is for example the switch operated to retract/deploy climbing device 20, control unit CR determines whether or not the operator is under a safe condition based on a signal indicating that the switch is turned on.

When it is determined that the operator is under a safe condition, then, whether or not there is an obstacle within a range of an operation of closing door 10 is sensed by a sensor (e.g., a camera), and determined by control unit CR (step S11a). When it is determined that there is an obstacle, the operator is notified by a sound through a speaker, a buzzer sound, etc. that an operation to close door 10 cannot be performed (step S12a).

When it is determined that there is no such obstacle, the operator is notified by a sound through a speaker, a buzzer sound, etc. that the operation to close door 10 is performed (step S13a). Subsequently, door driving unit 11 is activated to perform the operation to close door 10 (step S14a).

The operation to close door 10 is performed by extending door driving unit 11 (e.g., a hydraulic cylinder), as shown in FIG. 2.

Subsequently, whether or not an excessive load acts on door driving unit 11 is sensed by the load sensor, and determined by control unit CR (step S15a). When an excessive load is acting on door driving unit 11, the operation to close door 10 is stopped (step S17a), and the operator is notified that the operation to close door 10 cannot be performed (step S18a). If there is no excessive load acting on door driving unit 11, the operation to close door 10 is continued (step S16a). Once door 10 has completely been closed, the operator is notified accordingly.

As shown in FIGS. 5 and 8, whether or not there is an obstacle within a range on climbing device 20 and from the deployed position thereof to the retracted position thereof is sensed by a sensor (e.g., a camera), and determined by control unit CR (step S19a). When it is determined that there is an obstacle, the operator is notified by a sound through a speaker, a buzzer sound, etc. that an operation to retract climbing device 20 cannot be performed (step S20a).

When it is determined that there is no obstacle, the operator is notified by a sound through a speaker, a buzzer sound, etc. that the operation to retract climbing device 20 is performed (step S21a). Subsequently, climbing device 20 is actuated and thus shifted to the retracted position (step S22a). A state of shifting of climbing device 20 to the retracted position is displayed on a monitor (a display device) attached to wheel loader 40. Note that a setting is done such that locking of work implement 33 and a parking brake are not set off before climbing device 20 assumes the retracted position.

Whether climbing device 20 has assumed the retracted position is determined (step S23a). Once climbing device 20 has assumed the retracted position, the operator is accordingly notified by a sound through a speaker, a buzzer sound, etc. (step S24a). Furthermore, once climbing device 20 has assumed the retracted position, locking of work implement 33 and the parking brake can be set off (step S25a).

Hereinafter, a control applied when the operator gets out of wheel loader 40 will be described with reference to FIGS. 5, 9 and 10.

Figure 9:
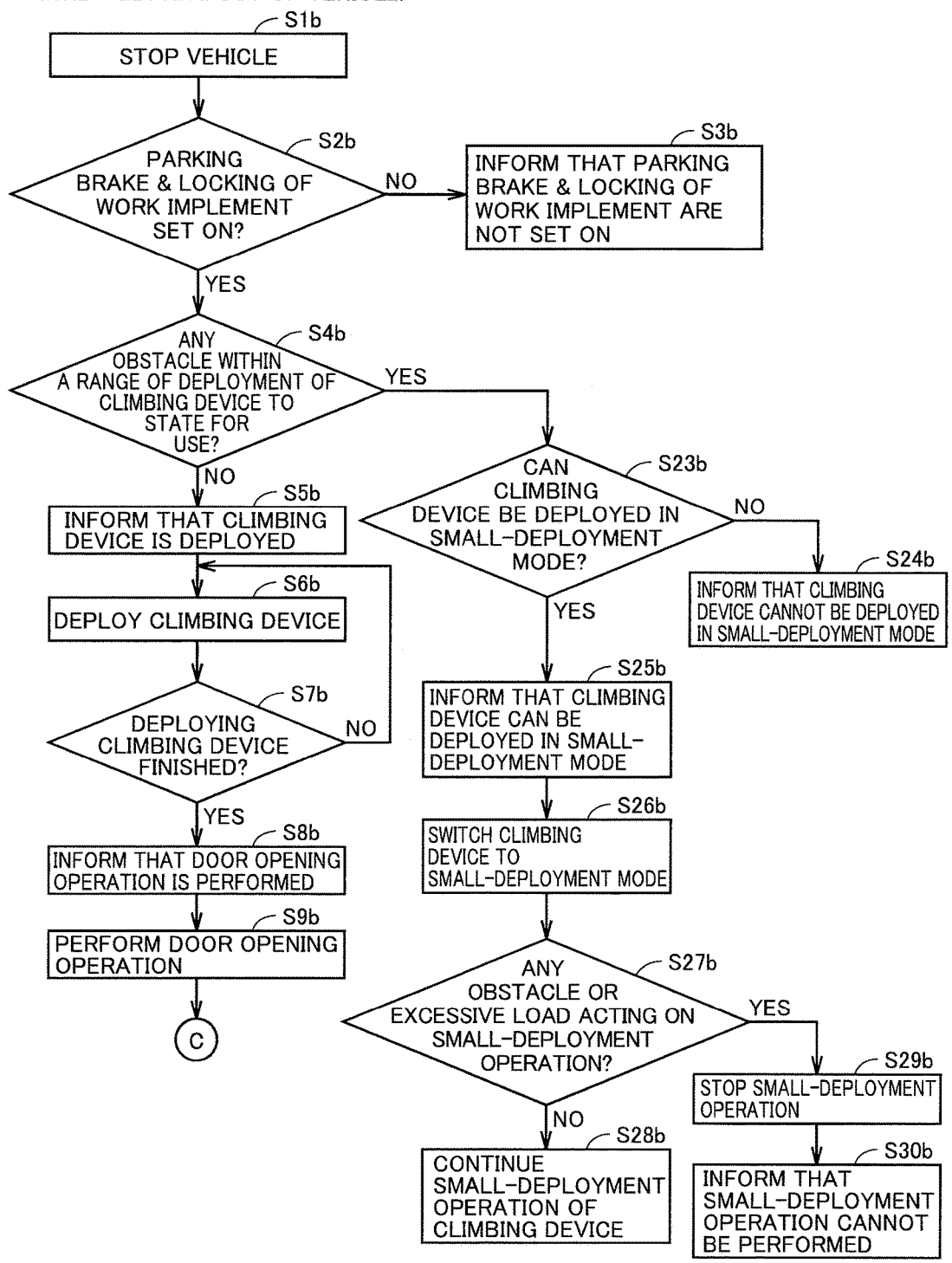
FIG. 9 is a first flowchart indicating a door opening/closing operation and a climbing device retracting/deploying operation performed when the operator gets out of the vehicle.
Figure 10:
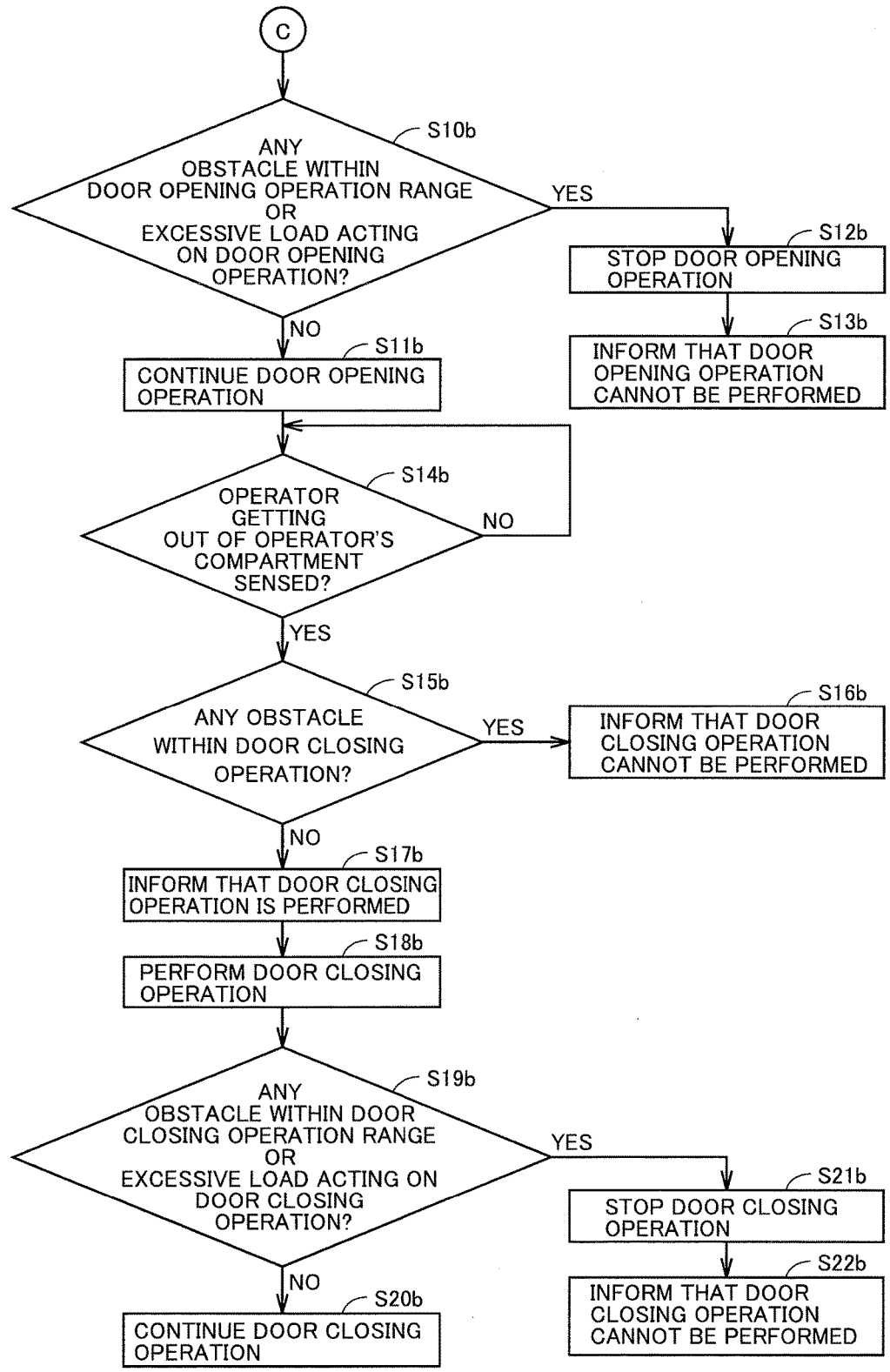
FIG. 10 is a second flowchart indicating the door opening/closing operation and the climbing device retracting/deploying operation performed when the operator gets out of the vehicle.

FIGS. 9 and 10 are flowcharts indicating a door opening/closing operation and a climbing device retracting/deploying operation performed when the operator gets out of the vehicle.

As shown in FIGS. 5 and 9, initially, wheel loader 40 stops (step S1b). In this state, operator's compartment 30 has door 10 closed and climbing device 20 assumes the retracted position.

Whether the parking brake is ON and locking the work implement is ON is determined (step S2b). When the parking brake and locking the work implement are not both ON, the operator is accordingly notified by a sound through a speaker, a buzzer sound, etc. (step S3b).

When the parking brake and locking the work implement are both ON, whether or not there is an obstacle within a range from the retracted position of climbing device 20 to the deployed position thereof is sensed by a sensor (e.g., a camera), and determined by control unit CR (step S4b). In doing so, at least one of: whether a getting-out switch is turned on/off; a result of sensing by the seating sensor; and a result of sensing by the seat belt sensor, is determined. When it is determined that there is no obstacle and when the getting-out switch is turned on, the seating sensor senses that the operator is not seated in the operator's seat, or the seat belt sensor senses that the seat belt is not fastened, the operator is informed, for example by a sound of through a speaker, a buzzer sound, or the like, that climbing device 20 is deployed from the retracted position to the deployed position (step S5b).

Subsequently, climbing device 20 is deployed from the retracted position to the deployed position (step S6b). Whether deploying climbing device 20 ends is determined (step S7b). When deploying climbing device 20 ends, the operator is notified, for example by a sound of through a speaker, a buzzer sound, or the like, that an operation to open door 10 starts (step S8b). Subsequently, the operation to open door 10 is performed (step S9b).

The operation to open door 10 is performed by retracting door driving unit 11 (e.g., a hydraulic cylinder), as shown in FIG. 2.

As shown in FIGS. 5 and 10, whether or not there is an obstacle within a range of an operation of opening door 10 or whether or not there is an excessive load acting on the operation to open door 10 is sensed by a sensor (e.g., a camera or a load sensor), and determined by control unit CR (step S10b). When it is determined that there is an obstacle or an excessive load, the operation to open door 10 is stopped (step S12b), and the operator is notified by a sound through a speaker, a buzzer sound, etc. that door 10 cannot be opened (step S13b).

When it is determined that there is no obstacle or excessive load, the operation to open door 10 is continued and door 10 is thus opened (step S11b). When the operation of opening door 10 is completed, the operator gets out of operator's compartment 30 through door 10 opened (and thus gets out of the vehicle) and climbs down climbing device 20. At the time, whether or not the operator has got out of operator's compartment 30 is sensed by a sensor, and determined by control unit CR (step S14b). This sensor is for example a camera, a load sensor for load on driving member 23b, a smart key or the like.

When the sensor is for example a camera, control unit CR determines whether or not the operator has got out of the vehicle based on an image of the operator picked up by the camera. When the sensor is for example a load sensor for load on driving member 23b, control unit CR determines whether or not the operator has got out of the vehicle based on a signal of the load sensor sensing a load received by climbing device 20. When the sensor is for example a smart key, control unit CR determines whether or not the operator has got out of the vehicle in response to a smart key receiver sensing that a smart key carried by the operator gets out of operator's compartment 30.

When it is determined that the operator has got out of the vehicle, whether or not there is an obstacle within a range of an operation of closing door 10 is sensed by a sensor (e.g., a camera), and determined by control unit CR (step S15b). When it is determined that there is an obstacle, the operator is notified by a sound through a speaker, a buzzer sound, etc. that the operation to close door 10 cannot be performed (step S16b).

When it is determined that there is no such obstacle, the operator is notified by a sound through a speaker, a buzzer sound, etc. that the operation to close door 10 is performed (step S17b). Subsequently, door driving unit 11 is actuated to perform the operation to close door 10 (step S18b).

The operation to close door 10 is performed by extending door driving unit 11 (e.g., a hydraulic cylinder), as shown in FIG. 2.

Thereafter, whether or not there is an obstacle within a range of an operation of closing door 10 or whether or not there is an excessive load acting on the operation to close door 10 is sensed by a sensor (e.g., a camera or a load sensor), and determined by control unit CR (step S19b). When it is determined that there is an obstacle or an excessive load, the operation to close door 10 is stopped (step S21b), and the operator is notified by a sound through a speaker, a buzzer sound, etc. that door 10 cannot be closed (step S22b).

When it is determined that there is no obstacle or excessive load, the operation to close door 10 is continued and door 10 is thus closed (step S20b).

As shown in FIG. 9, when it is determined that there is an obstacle in step S4b, whether climbing device 20 can be deployed in a small-deployment mode is determined (step S23b). If climbing device 20 cannot be deployed in the small-deployment mode, the operator is accordingly notified for example by a sound of through a speaker, a buzzer sound, or the like (step S24b).

If climbing device 20 can be deployed in the small-deployment mode, the operator is accordingly notified for example by a sound of through a speaker, a buzzer sound, or the like (step S25b). Subsequently, shifting to the small-deployment mode is done (step S26b).

When climbing device 20 is deployed in the small-deployment mode, whether or not there is an obstacle within a range of a small-deployment operation or whether or not there is an excessive load acting on the operation to open door 10 is sensed by a sensor (e.g., a camera or a load sensor), and determined by control unit CR (step S27b). When it is determined that there is an obstacle or an excessive load, the small-deployment operation is stopped (step S29b) and the operator is notified by a sound through a speaker, a buzzer sound, etc. that the small-deployment operation cannot be performed (step S30b). When it is determined that there is no obstacle or excessive load, the small-deployment operation is continued and climbing device 20 attains a small-deployment state (step S28b).

Note that the climbing device is deployed/retracted by turning on/off a switch operated to deploy/retract the climbing device for example.

Hereinafter, an exemplary variation of door 10 will described with reference to FIG. 11.

Figure 11:
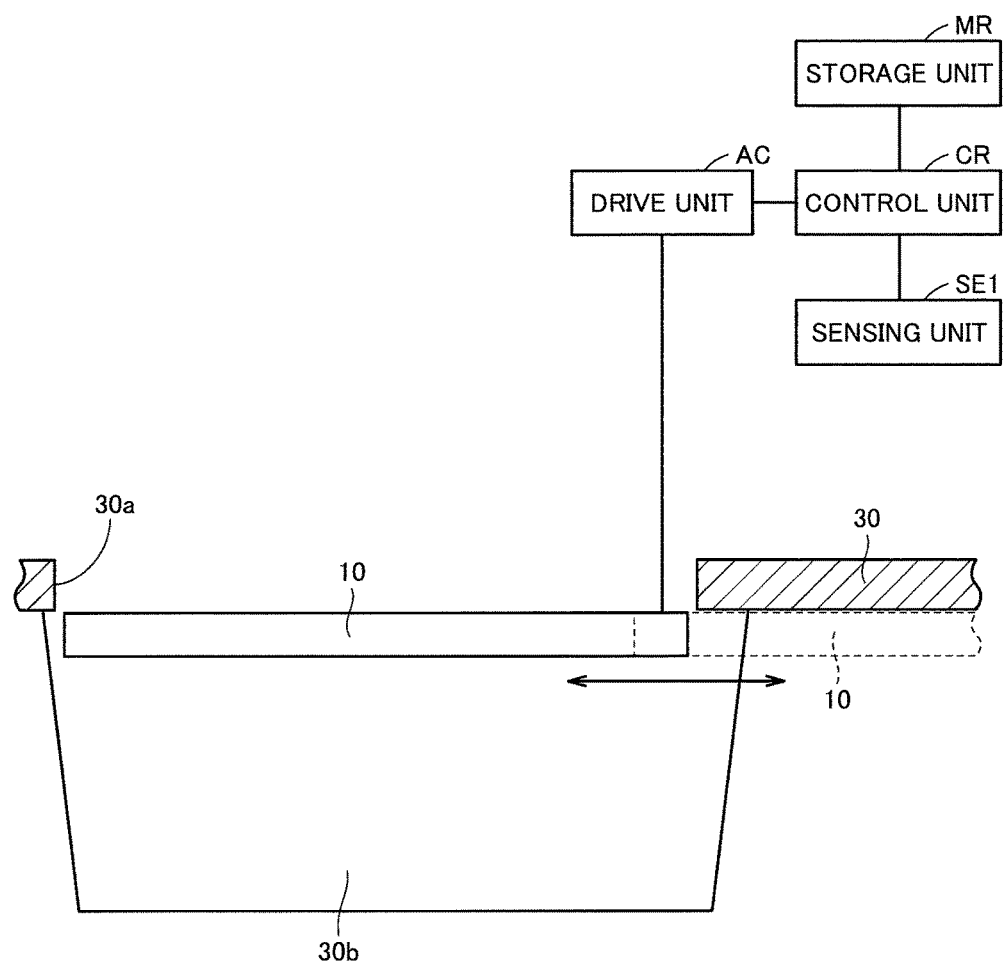
FIG. 11 is a schematic plan view showing an operation of opening and closing a door in an exemplary variation used in a wheel loader according to one embodiment of the present invention.

FIG. 11 is a schematic plan view showing an operation of opening and closing a door in an exemplary variation used in a wheel loader according to one embodiment of the present invention.

While in the above embodiment a case has been described in which door 10 is a foldaway door 10, door 10 according to the present embodiment may be a door in any type that recognizes an operator and is automatically opened (or closed). For example, as shown in FIG. 11, door 10 may be a slidable door. Slidable door 10 is composed of a single plate for example. When this door 10 moves in the frontward/rearward direction, opening 30a for the door can be opened/closed. A sliding operation of door 10 is performed by a drive unit AC. Drive unit AC may be a hydraulic cylinder or may be a motor or the like.

Except for the above, slidable door 10 has a configuration substantially identical to that of foldaway door 10 shown in FIG. 2, and accordingly, identical components are identically denoted and will not be described redundantly.

While in the above embodiment a case has been described in which whether or not an operator has got out of operator's compartment 30 (i.e., whether or not the operator has got out of the vehicle) is sensed and an operation is performed to automatically close door 10, whether the operator has moved away from climbing device 20 may be sensed and an operation to automatically close door 10 may accordingly be performed.

A function and effect of the present embodiment will be described.

According to the present embodiment, as shown in FIG. 2, door driving unit 11 is provided which automatically opens door 10 in response to sensing unit SE1 sensing an operator. Therefore, it is unnecessary for the operator to manually open large door 10 of operator's compartment 30 while holding handrail portion 22 on climbing device body 21. Therefore, it is easy for the operator to get in operator's compartment 30 from climbing device 20.

Further, according to the present embodiment, as shown in FIG. 2, the entire locus of opening and closing of door 10 overlaps in a plan view with step 30b fixed to operator's compartment 30. Therefore, when door 10 is opened/closed, door 10 will never stick out of step 30b in a plan view. This can prevent door 10 from colliding against an operator on climbing device body 21 while the door is being opened/closed.

Furthermore, according to the present embodiment, as shown in FIG. 2, door 10 is a foldaway door. Accordingly, when door 10 is opened/closed, door 10 can be easily prevented from sticking out of step 30b in a plan view.

Furthermore, in the present embodiment, as shown in FIG. 2, control unit CR controls door driving unit 11 based on a result of comparing sensed information of an operator sensed by sensing unit SE1 with operator information stored in storage unit MR. This allows the operator to be subjected to personal authentication.

Furthermore, according to the present embodiment, sensing unit SE1 senses that an operator steps on climbing device 20. This allows door 10 to be opened at a time point when the operator steps on the climbing device.

Furthermore, according to the present embodiment, door 10 is automatically closed after the operator gets out of operator's compartment 30. Therefore, it is unnecessary for the operator to manually close large door 10 of operator's compartment 30 while the operator gets out of operator's compartment 30 and is present on climbing device body 21. The operator can easily get out of operator's compartment 30 to climbing device 20.

Furthermore, according to the present embodiment, as shown in FIG. 1, solar panel 35 is disposed on an upper surface of operator's compartment 30. As a result, even when wheel loader 40 is stopped with the engine stopped, solar panel 35 can generate electric power, which allows an air conditioner to operate and air conditioning to be done in operator's compartment 30.

Furthermore, according to the present embodiment, as shown in FIG. 3 and FIG. 4, handrail portion 22 in the deployed position is in a raised state in which gripping portion 22a is moved away from climbing device body 21, and handrail portion 22 in the retracted position is in a folded state in which gripping portion 22a approaches climbing device body 21. As handrail portion 22 is thus folded in the retracted position, a dimension of handrail portion 22 projecting outward in directions rightwardly and leftwardly of wheel loader 40 can be limited to be small. This can prevent handrail portion 22 otherwise projecting sideways in the retracted position from interfering with an obstacle.

Furthermore, according to the present embodiment, as shown in FIG. 3, in the retracted position, gripping portion 22a has upper end 22a1 located below step 30b. Therefore it is easy in the retracted position to accommodate climbing device 20 within an area directly under step 30b. This suppresses projection of climbing device 20 in a plan view outwardly of step 30b in directions rightwardly and leftwardly of wheel loader 40. This can prevent handrail portion 22 in the retracted position from interfering with an obstacle.

Furthermore, according to the present embodiment, as shown in FIG. 3 and FIG. 4, handrail portion 22 has gripping portion 22a, coupling piece 22b, and a pair of link members 22e1 and 22e2, and these parts configure a rectangular link mechanism. Handrail portion 22 can be folded by deforming this rectangular link mechanism.

Furthermore, according to the present embodiment, as shown in FIG. 3 and FIG. 4, side member 21d has first member 21b rotatably supported by the vehicular body and second member 21c attached to first member 21b slidably relative thereto. By sliding second member 21c relative to first member 21b, side member 21d can be changed in length. Accordingly, in the deployed position, side member 21d can be extended to be long from a vicinity of the ground to a high place. Further, in the retracted position, by shortening side member 21d, an appropriate space can be ensured between second end portion 21B of the climbing device body and the ground.

Further, the other link member 22e2 has first link piece 22c attached to first member 21b rotatably to be slidable relative to second member 21c. When first member 21b slides relative to second member 21c, first link piece 22c of the other link member 22e2 is also slidable relative to second member 21c, and handrail portion 22 can appropriately function as a link mechanism.

Furthermore, according to the present embodiment, as shown in FIG. 3 and FIG. 4, connection member 21e has one end portion rotatably supported by second member 21c, and the other end portion attached to gripping portion 22a rotatably together with second link piece 22d of the other link member 22e2. Accordingly, as second member 21c slides relative to first member 21b, connection member 21e is rotated relative to second member 21c and thus raised or inclined and thus collapsed. As connection member 21e is raised or inclined and thus collapsed, the other link member 22e2 also has second link piece 22d rotated relative to second member 21c and thus raised or inclined and thus collapsed. Handrail portion 22 can thus be shifted between the raised state and the folded state.

Furthermore, according to the present embodiment, as shown in FIG. 3 and FIG. 4, support member 23 has one end portion 23A attached to the vehicular body, and the other end portion 23B attached to second member 21c rotatably. Furthermore, a distance between one end portion 23A and the other end portion 23B can be extended and contracted by driving member 23b. By using driving member 23b to extend/contract support member 23, second member 21c can be slid relative to first member 21b, and climbing device body 21 can be shifted between the retracted position and the deployed position.

Furthermore, according to the present embodiment, as shown in FIG. 3 and FIG. 4, support member 23 includes driving member 23b allowing a distance between one end portion 23A and the other end portion 23B to be extended and contracted. Driving member 23b allows climbing device body 21 to be automatically shifted between the retracted position and the deployed position.

Furthermore, according to the present embodiment, as shown in FIG. 3 and FIG. 4, a plurality of step portions 21a have a first step portion 21a1, a second step portion 21a2, and a third step portion 21a3. First step portion 21a1 is a step portion of the plurality of step portions 21a attached to a side of first member 21b closest to second end portion 21B. Second step portion 21a2 is a step portion of the plurality of step portions 21a attached to a side of second member 21c closest to second end portion 21B. Third step portion 21a3 is attached to second member 21c between first step portion 21a1 and second step portion 21a2 slidably. Accordingly, when second member 21c slides relative to first member 21b, then, engaged with the sliding, third step portion 21a3 can also be slid relative to second member 21c.

Furthermore, when second member 21c slides relative to first member 21b, then, in response to the amount of the sliding, a distance between third step portion 21a3 and first step portion 21a1, a distance between third step portion 21a3 and second step portion 21a2, and a distance between third step portions 21a3 vary. Furthermore, according to the present embodiment, as shown in FIG. 3 and FIG. 4, an auxiliary link member 21f is provided: between third step portion 21a3 and first step portion 21a1; between third step portion 21a3 and second step portion 21a2; and between third step portions 21a3. Auxiliary link member 21f allows a distance between third step portion 21a3 and first step portion 21a1, a distance between third step portion 21a3 and second step portion 21a2, and a distance between third step portions 21a3 to be adjusted as appropriate.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST

10: door; 20: climbing device; 10a, 10b: door panel; 10c, 10d, 11a, 11b, 21ba rotation shaft; 10e: sliding piece; 11: door driving unit; 21: climbing device body; 21a: step portion; 21a1: first step portion; 21a2: second step portion; 21a3: third step portion; 21a4: uppermost step portion; 21b: first member; 21c: second member; 21ca: tubular portion; 21cb: opening; 21 cc: projecting portion; 21d: side member; 21e, 23a: connection member; 21f: auxiliary link member; 21g: pivoting member; 21A: first end portion; 21B: second end portion; 22: handrail portion; 22a: gripping portion; 22a1: upper end; 22b: coupling piece; 22b1: one end; 22b2: the other end; 22c: first link piece; 22d: second link piece; 22e1: one link member; 22e2: the other link member; 23: support member; 23A: one end portion; 23B: the other end portion; 23b: driving member; 23c: fixture; 30: operator's compartment; 30a: opening for door; 30aa: guide rail; 30b: step; 31: front frame; 32: rear vehicular body; 32a: hydraulic oil tank; 32b: engine compartment; 33: work implement; 33a: boom; 33b: bucket; 33d: bell crank; 33e: bucket cylinder; 33f link; 34a: front wheel; 34b: rear wheel; 35: solar panel; 40: wheel loader; AC: drive unit; CR: control unit; MR: storage unit; SE1, SE2: sensing unit.

The invention claimed is:

1. A work vehicle comprising:
a climbing device;
an operator's compartment located above the climbing device and having a door;
a sensing unit for sensing an operator; and
an actuator for automatically opening and closing the door in response to the sensing unit sensing the operator,
wherein the actuator has one end portion attached to the operator's compartment rotatably about a first rotation shaft and the other end portion attached to a door panel rotatably about a second rotation shaft.

2. The work vehicle according to claim 1, wherein
the operator's compartment has a step directly under the door, and
an entire locus of opening and closing of the door overlaps with the step in a plan view.

3. The work vehicle according to claim 1, wherein the door is a foldaway door.

4. The work vehicle according to claim 1, further comprising:
a storage unit configured to previously store operator information; and
a control unit configured to control the door driving unit based on a result of comparing sensed information of the operator sensed by the sensing unit with the operator information stored in the storage unit.

5. The work vehicle according to claim 1, wherein the sensing unit senses that the operator steps on the climbing device.

6. The work vehicle according to claim 1, wherein the door automatically closes after the operator has got out of the operator's compartment.

7. The working vehicle according to claim 1, further comprising a solar panel disposed on an upper surface of the operator's compartment.

* * * * *